(12) United States Patent
Thuline

(10) Patent No.: US 6,470,826 B2
(45) Date of Patent: Oct. 29, 2002

(54) POULTRY FEEDER

(75) Inventor: Timothy Thuline, Taylorville, IL (US)

(73) Assignee: The GSI Group, Inc., Assumption, IL (US)

( * ) Notice: Subject to any disclaimer, the term of this patent is extended or adjusted under 35 U.S.C. 154(b) by 19 days.

(21) Appl. No.: 09/764,749

(22) Filed: Jan. 18, 2001

(65) Prior Publication Data

US 2001/0047766 A1 Dec. 6, 2001

Related U.S. Application Data

(60) Provisional application No. 60/176,738, filed on Jan. 19, 2000.

(51) Int. Cl.$^7$ ............................................... A01K 39/01
(52) U.S. Cl. ...................................... 119/52.4; 119/57.4
(58) Field of Search ........................ 119/52.4, 53, 57.4, 119/57.5, 57.7, 57

(56) References Cited

U.S. PATENT DOCUMENTS

| 3,033,163 A | | 5/1962 | Hostetler et al. |
| 3,230,933 A | | 1/1966 | Myers et al. |
| 3,415,228 A | | 12/1968 | Myers |
| 3,598,087 A | | 8/1971 | Ramser |
| 3,971,340 A | | 7/1976 | Allen |
| 4,003,339 A | | 1/1977 | Hostetler |
| 4,476,811 A | | 10/1984 | Swartzendruber |
| 5,007,380 A | | 4/1991 | Badia et al. |
| 5,462,017 A | * | 10/1995 | Pollock et al. ................. 119/53 |
| 5,718,187 A | | 2/1998 | Pollock et al. |
| 5,724,912 A | * | 3/1998 | Cull ............................ 119/57.2 |
| 5,765,503 A | * | 6/1998 | van Daele .................. 119/52.4 |
| 5,794,562 A | * | 8/1998 | Hart ............................ 119/52.4 |
| 5,875,733 A | * | 3/1999 | Chen ............................ 119/53 |
| 5,927,232 A | * | 7/1999 | Pollock ......................... 119/53 |
| 6,050,220 A | * | 4/2000 | Kimmel et al. ............... 119/53 |

* cited by examiner

Primary Examiner—Yvonne R. Abbott
(74) Attorney, Agent, or Firm—Polster, Lieder, Woodruff & Lucchesi, L.C.

(57) ABSTRACT

A poultry feeder which includes a mechanism for automatically adjusting the size of the opening from the feeder's drop tube to the feeder pan so as to permit the feed pan to be flooded with feed as young chicks are introduced into a poultry house and then, as the chicks grow, to automatically reduce the amount of feed introduced into the pan. The feeder includes a feed level controller movable relative to the feeder's drop tube to be moveable axially relative to the drop tube and feeder pan. The drop tube includes a plurality of support members (fins) pivotally mounted to the drop tube body and which extend from the body outlet. The support members are movable between a first or spread-apart position when the drop tube is in its lowered position wherein the support members extend outwardly of the drop tube body thereby to permit flooding of the feed pan and a second or collapsed position when the drop tube is in its raised position such that the support members lessen the opening between the feed pan and the feed level controller so as to reduce the amount of feed deposited in the feed pan. The bottom edge of the feed level controller body rides on the upper edge of the support members.

20 Claims, 7 Drawing Sheets

POULTRY FEEDER

CROSS-REFERENCE TO RELATED APPLICATIONS

Priority is claimed under U.S. Provisional Application No. 60/176,738, filed Jan. 19, 2000 in accordance with 35 USC § 119(e).

STATEMENT REGARDING FEDERALLY SPONSORED RESEARCH OR DEVELOPMENT

BACKGROUND OF THE INVENTION

This invention relates to poultry feed systems in which feed is conveyed to a series of feeding stations where it is dispensed for chickens (or other livestock) to eat and, more particularly, to a poultry feeder located at each of the feeding stations which allows young chicks to readily see and to have access to the feed in the feeder, and which is adjustable to retain feed in the feeder and to better accommodate larger birds as the birds mature.

Poultry feedings systems are well-known in the art. Examples of such feeding systems and feeders used in them are disclosed in U.S. Pat. Nos. 5,007,380; 4,476,811; 4,003,339; 3,971,340; 3,598,087; 3,415,228; 3,230,933; and 3,033,163. As shown in these various patents, feed from a bulk feed tank located outside of the poultry house is discharged into a hopper or similar intake receptacle. From there, the feed is conveyed through a conveyor tube to a sequence of spaced feed stations. From the conveyor, feed is deposited into a feed pan at each feed station. In the past, feeders were designed for use by older birds which had grown tall enough to see into and to reach the feed in the feed pan at the bottom of the feeder.

It was recognized that young chicks could not see the feed in the feed pan and that the small chicks could not access the feed because the feed pan was often too high. Consequently, upon the introduction of chicks in a poultry house, feed was often simply deposited in piles on the floor of the house (or on a strip of paper laid on the floor) intermediate each of the feeding stations. This allowed the young chicks to see and to eat the feed in the piles, but resulted in substantial spoilage and waste of feed.

In the past, the feed conveyor tube was provided with openings intermediate the feeding stations which, prior to introduction of chicks into the house, could opened to deposit piles of feed between the feeding stations. As shown in U.S. Pat. No. 4,488,509, shallow feed pans were sometimes used to contain the loose feed and to provide the chicks access to the feed. Such shallow feed pans required substantial labor to install in the house prior to introduction of the chicks and still resulted in a substantial waste of feed.

Feeders were developed which could be used by both young and more mature chicks. Such feeders are shown in the above-noted U.S. Pat. Nos. 4,476,811 and 5,007,380 which incorporated special windows in their feed drop tubes which could be used to flood the feed pan with feed to insure access by the small chicks. While these feeders solved some of the problems, others still remained. One problem, for example, involved spoilage of the feed. Excess feed deposited in the drop tube and in the pan may become stale or off taste to the birds. This may result in the birds not eating as they should with a consequent slower growth rate or a lower conversion of feed into marketable poultry protein. This can lead to waste of the feed and spoilage of the feed.

A second problem involved adjusting the height of the pan so it is accessible by all of the chicks. Pans located at low spots or areas of the poultry house floor will be too high for young chicks to see or to reach into the feed pan. In practice, with a poultry house having a length of about 300 feet or so, it has been found necessary to maintain the level of the litter on the floor relative to the level of the feed line supported overhead to be within a close limit (e.g., 1–2 inches) so as to insure that all of the prior art flood window feeders would properly flood when the feed line was lowered toward the floor. In addition, if variations in floor level relative to the level of the feed line were present, variations as small as 1.5 inches could cause some of the feeders of the line to be properly adjusted for the height of the birds while others of the feeders would be too high for the birds to see the feed in the feeders. This could cause the birds to not feed at the feeders which were too high and to congregate at the other feeders such that too many birds would try to eat from one feeder. This could result in stress and in that birds may not obtain adequate feed rations and some birds may not grow at the desired rates. Also, the feed in the feeders that were too high might be wasted.

Third, the feeders were supported (suspended) from the conveyor tube and the latter was typically suspended from the roof of the poultry house by means of cables and winches such that the entire conveyor along with all of the feed pans may be raised and lowered, as shown, for example, in U.S. Pat. No. 3,033,163. While the height of the conveyor above the floor may be relatively uniform, variations in height still occurred. In feeders such as those described in the noted prior patents, height adjustment of the feeder relative to the floor is non-existent, or limited. Upon lowering the feeders toward the floor, one of the feeders may contact the floor or the litter prior to the others (due to a high spot of the litter on the floor). This may place undue weight on this one feeder.

It has also been a problem with prior art poultry feeders, particularly with prior art feeders that use so-called "flood" windows to provide excess feed within the feeder when baby chicks are first placed in the poultry house so as to insure that the chicks are able to visually see the feed in the feeder, that such feeder have large quantifies of feed (e.g., several pounds of feed) which is not consumed by the young chicks, which may become fouled by droppings, and which may go stale. About 10 days into the growing cycle, it is conventional to close these flood windows and to allow feed to flow into the feeder in the conventional way. However, the fouled and stale feed that remains in the feeder causes problems. It will be noted that such stale and fouled feed may contaminate the new feed delivered to the feeder or the birds may have to consume the fouled or stale feed prior to having access to new, fresh feed delivered to the feeder. It has been found that in many poultry operations, the chicks undergo a stall in their growth rate at about the time the flood windows are closed. Similarly, if the chicks were introduced to feed through the use of piles of feed deposited on the floor of the poultry house (as discussed above), at about 10 days into the growing cycle, the birds must be convened from eating from these piles of now stale and fouled feed to feed delivered to the feeder, there has been noted a similar stall in the growth rate of the birds. Such stalls in the growth rate means either that the growing period for the flock must be extended a few more days, or if the birds are marketed at the end of the normal growth period, the liveweight of the birds may be less than desired.

Many of these problems were solved by the poultry feeder shown in U.S. Pat. No. 5,718,187, which is incorporated herein by reference. The feeder shown in that patent works extremely well. However, it could still be improved upon.

For example, it is desirable to have more feed in the pan when the chicks are young, and less feed in the pan when the birds are older and more mature. Reducing the feed in the pan as the birds become older reduces the amount of feed that is scratched or pecked out of the feeder, and consequently reduces spoilage of the food. Conversely, having more food available when the birds are young, makes the food more readily visible and available to the chicks. As is known, the level of the food in the pan is a function of the distance of a feed level controller from the bottom of the pan. The farther the controller is from the pan bottom, the more feed will be deposited in the pan. The feeder described in the U.S. Pat. No. 5,718,187 allows for manual adjustment of the feed level control. However, it can be appreciated that it would take a considerable amount of time to adjust the fed controls on all the feeders in a poultry house. It would be desirable to automate the feed level controller, so that as the feeder is adjusted to feed maturing birds, the position of the controller will automatically adjust to reduce the amount of feed in the pan.

BRIEF SUMMARY OF THE INVENTION

A poultry feeder of the present invention is one which can be used throughout the growth of a chicken, or other bird. Thus, the feeder can be used with chicks, as well as with mature birds. The feeder is provided with a mechanism which will automatically adjust the size of the opening from the feeder's drop tube to the feeders pan, so that the feeder will be flooded with feed, so that sufficient feed will be available for small chicks, and to reduce the amount of feed in the pan, to prevent flooding of the feed pan for adult birds.

The feeder includes the feed pan into which feed is deposited, a drop tube in communication with a source of feed for delivering feed to the feed pan; a feed level controller slidable on the drop tube for controlling the level of feed in the pan, and an adjustment mechanism for positioning the feed level controller relative to the drop tube and the feed pan so that the pan will be flooded with the feeder is set up for chicks and will reduce the amount of feed in the pan when the feeder is adjusted to feed mature birds.

The drop tube is movable axially relative to the feed pan between a raised position and a lowered position. It includes a body having an inlet and an outlet. The space between the drop tube outlet and the feed pan defines a feeder opening through which feed flows into the feed pan.

The feed level controller includes a body movable on the drop tube body so as to be moveable axially relative to the drop tube body. As the controller is lowered relative to the drop tube body, to be closer to the feed pan, the size of the feeder opening is reduced, and, concomitantly, the amount of feed which may enter the pan is reduced.

To automatically control the position of the feed level controller relative to the feed pan (and hence to automatically control the size of the feeder opening) the drop tube is provided with a plurality of drop tube support members (fins) pivotally mounted to the drop tube body and extending from the body outlet. The support members (fins) are disposed between the feed pan and the lower edge of the drop tube body, and are sized to be in contact with the feed pan at least when the drop tube is in the lowered position. Each of the support members has a curved lower surface which bears on the feed pan cone and which serves as a curvilinear cam surface. The support members are movable between a spread-apart position when the drop tube is in its lowered position wherein the support members extend outwardly of the drop tube body; and collapsed position when the drop tube is in its raised position wherein the support members are substantially contained within an area defined by the diameter of the drop tube body.

The bottom edge of the feed level controller body rides on the upper edge of the support members. Thus, when the drop tube is in its lowered and the support members are in their spread-apart position, the feed level controller sits on the support member (fin) upper edges and is spaced from the feed pan to define a large feeder opening. The curvilinear shape of the support members varies the distance the lower end of the drop tube is supported with respect to the feed pan, depending on the position of the support members. Thus, when the drop tube is in its raised position and the support members are in their collapsed position; the feed controller is closer to the feed pan to reduce the size of the feeder opening to restrict the amount of feed which is deposited in the feed pan. As the drop tube is raised to adjust the feeder to accommodate older and larger birds, the support members will be pulled inwardly towards their collapsed position, and the feed level controller will be lowered to be closer to the feed pan, thereby reducing the size of the feeder opening. Therefore, the feeder opening size will be automatically reduced to reduce the amount of feed in the feed pan. This substantially eliminates the need for manual setting of the feeders to alter the amount of feed which is deposited in the feed pans as the birds grow.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes what I presently believe is the best mode of carrying out the invention.

Figure 1:
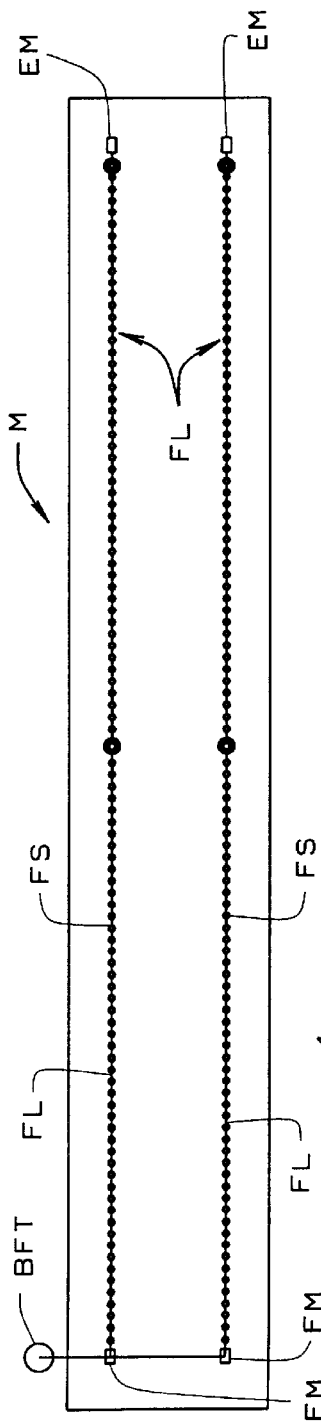
FIG. 1 is a diagrammatic plan view of a poultry house having an automated poultry feed system installed therein for supplying poultry feed from a bulk feed tank on the outside of the house to a multiplicity of poultry feeders of the present invention arranged in one or more feed conveyor lines within the house.
Figure 3:
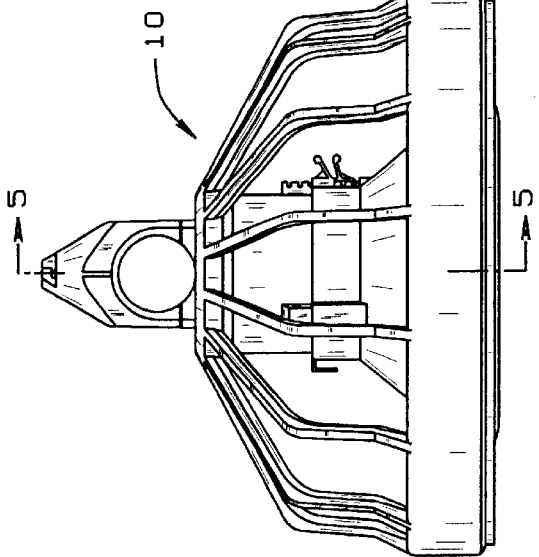
FIG. 3 is a view of the feed similar to FIG. 2 in which the feeder is in its lowered (shallow pan depth) position in which a young chick just introduced into the house may readily visually see feed within the feed pan of the feeder and have access thereto.
Figure 2:
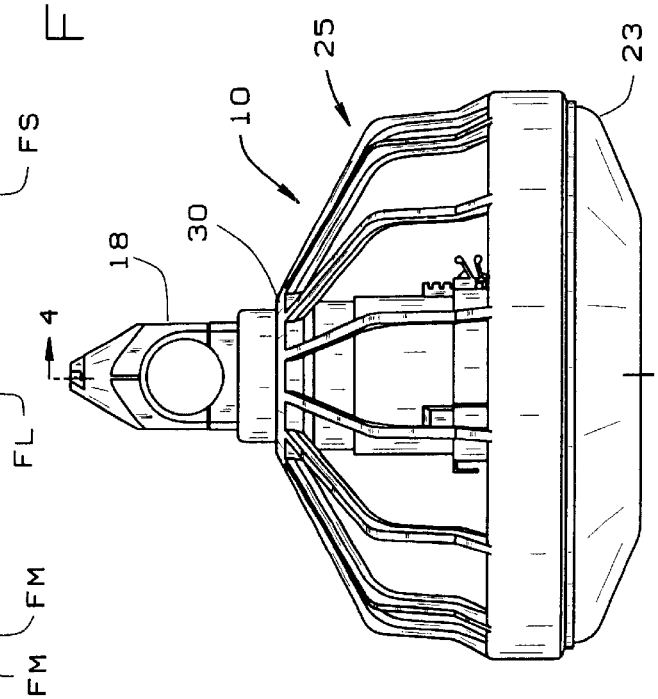
FIG. 2 is a side elevation view of a poultry feeder of the present invention viewed from the side of the feeder in line with the feed conveyor tube, the feed conveyor tube being raised and lowered with respect to the floor of the house by means of cable and winch arrangement or the like, with the feeder shown in its raised, suspended (deep pan depth) position in which a feed pan of the feeder is just in contact with the floor or is clear of the floor.

Referring now to the drawings and particularly to FIG. 1, a poultry house is indicated in its entirety at H. Typically, such poultry houses are long structures having a length of several hundred feet and a width of about 40–60 feet. For example, a typical poultry house H may have a length of about 300 feet and house about 15,000–20,000 birds. Typically, these poultry houses are equipped with an automated feeding system consisting of one, two, or more feed lines FL which typically run the length of the house. Each of these feed lines has a feed hopper FH which receives poultry feed from a bulk feed tank BFT located outside of the poultry house. Each of the feed hoppers FH is connected to a feed conveyor FC comprising a feed conveyor tube T having an auger A (FIG. 4) conveyor therein. The auger may be rotatably driven by an electric motor EM within its respective conveyor tube. Alternatively, the auger may be a so-called centerless or flexible auger, such as shown in U.S. Pat. No. 4,460,230, or other such conveying means. If such flexible augers are used, it will be understood that the feed conveyor FC may be an endless loop within the poultry house with each elongate side of the loop constituting one of the feed lines FL.

Each of the feed lines has a multiplicity of feeding stations FS spaced at substantially equal intervals (e.g., about 2.5 foot intervals) along the feed line. For example, in a feed line having a length of about 280 feet, there may be about 112 feeding stations FS. Generally, growers prefer to have about one feeding station FS for every 60–65 grown broilers. Each feeding station FS includes a feeder 10 of the present invention.

An improved poultry feeder 10 of the present invention is connected in poultry feed system FS such that feed delivered by feed conveyor FC is delivered to a multiplicity of the feeders 10. The conveyor tube T is typically a horizontal tube suspended from the roof structure of the poultry house by means of a winch and cable mechanism (not shown) so that the entire feed line FL including all of the feeders 10 mounted thereon may be simultaneously raised and lowered with respect to the floor F of the poultry house in the manner well known in the art. For example, such a typical winch and cable (or chain) lifting mechanism is described in U.S. Pat. No. 3,033,163, which is incorporated herein by reference. At each of the feeding stations FS located along the length of feed conveyor tube T, an opening O is formed in the bottom of the conveyor tube to discharge feed into a respective feeder 10. If the feeder is full, no feed is discharged at that point, and feed will be conveyed to the next feeding station.

In a typical poultry operation, young chicks (perhaps as many as 20,000–40,000 one day old chicks) are introduced into a poultry house H at one time. The house typically has litter (e.g., wood chips) on the floor F. Feed is automatically supplied by means of the feed line FL and water is automatically supplied by automatic watering systems (not shown). Heretofore, small chicks have had a problem seeing the feed in conventional feed pans. To overcome this problem, and to teach young chicks to eat the feed, piles of loose feed were deposited on sheets of heavy biodegradable paper in the space between feeding stations. After the young chicks learned to eat the loose feed (usually within a few days), additional feed would be supplied to the feed stations by means of the feed conveyor. By that time, the chicks had sufficiently grown such that they were able to see the feed in the feed stations. While this method of introducing feed to chicks worked well, it did result in substantial quantities of wasted or spoiled feed. It is a feature of the present invention that feed in the feed pan of feeder 10 is readily viewable by and is readily accessible to even small chicks thus eliminating or reducing the need for piles of loose feed. In this manner, the amount of spoiled or wasted feed is significantly reduced. It will also be appreciated that by using the feeder 10 of the present invention that the birds are introduced to feed at the earliest possible time from the feeder rather than from piles of loose feed on the floor or from so-called "chick" feed pans.

Figure 6:
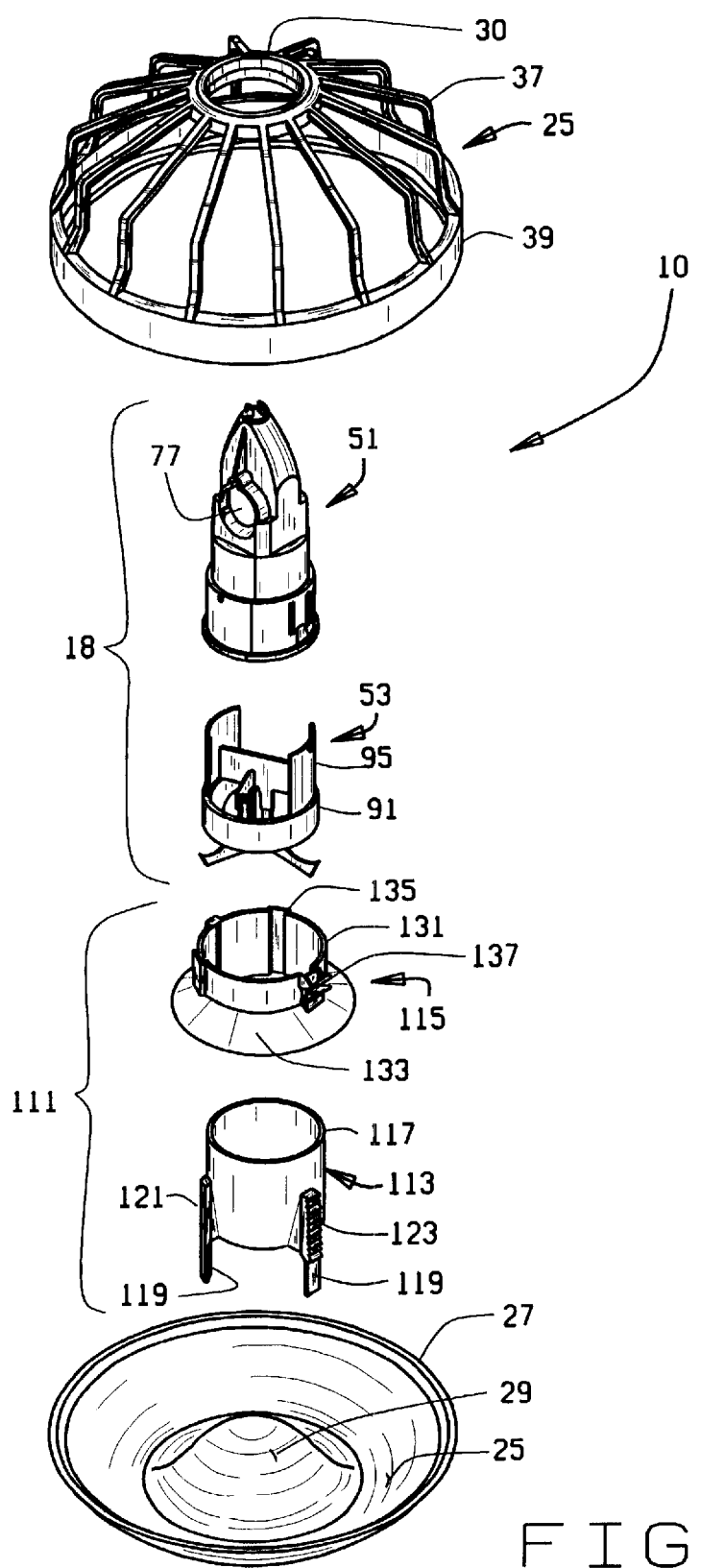
FIG. 6 is an exploded perspective view of the major components of the feeder of the present invention.
Figure 7:
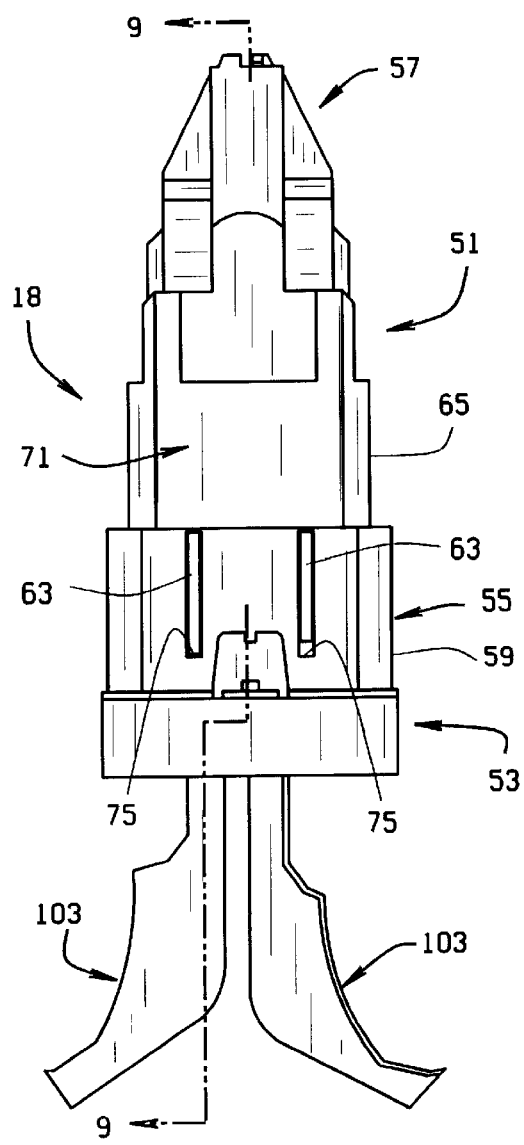
FIG. 7 is a front elevation view of the drop tube.
Figure 8:
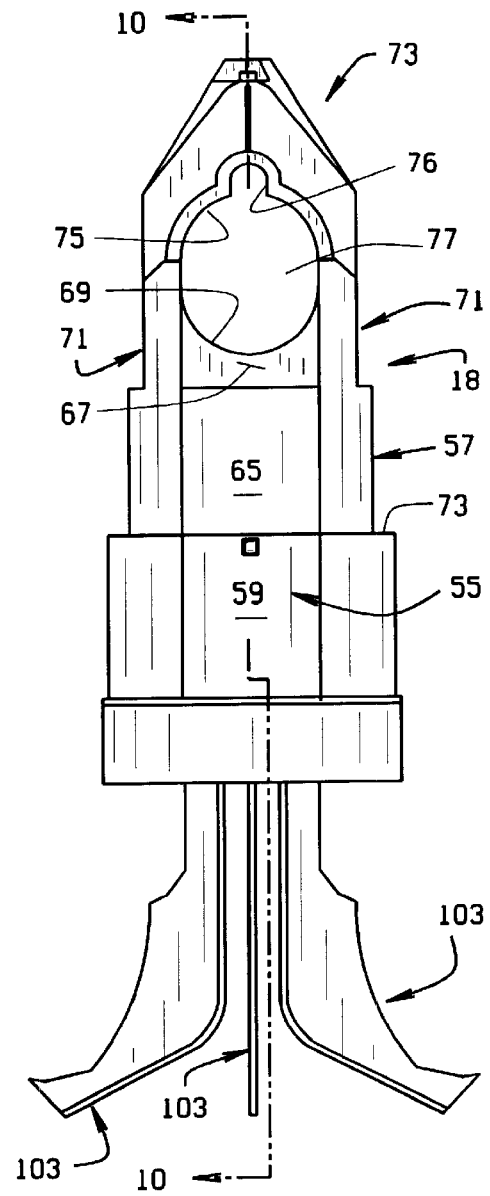
FIG. 8 is a side elevation view of the drop tube.

The major components of feeder 10 are best shown in FIG. 6. More specifically, feeder 10 includes a centrally located vertical feed drop tube 18 into which feed is deposited from opening in the conveyor tube T. Feed drop tube 18 has an inlet 20 at its upper end and an outlet 22 at its lower end. Feed drop tube 18 is vertically positioned in the feeder for the feed deposited into the tube to fall into a feed pan 23. The feeder 10 also includes a grill assembly 25 (or other support means) for supporting feed pan 23 relative to feeder 10, and more particularly relative to drop tube 18, and for preventing larger birds from climbing into the feed pan.

The feed pan 23 includes a bottom 25 and a circumferential wall 27 about the pan bottom 25. A lip 28 extends outwardly from the upper edge of the pan wall 27. The pan includes a central conical section 29.

Figure 4:
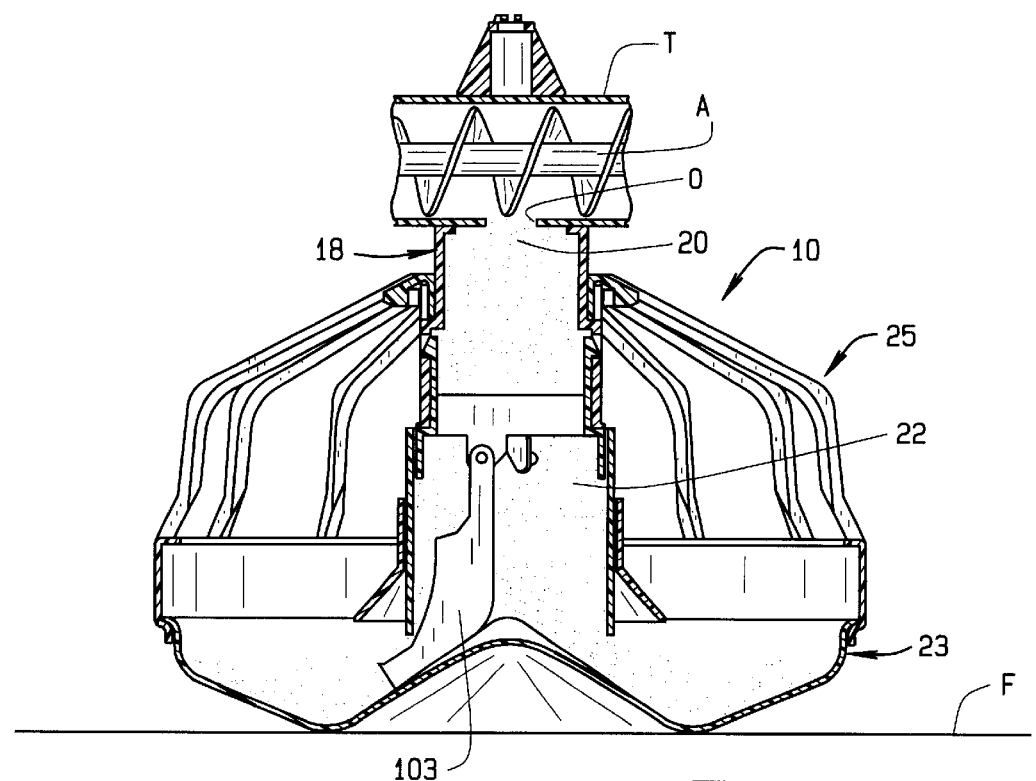
FIG. 4 is a cross-sectional view of the feeder in the raised position, taken along line 4—4 of FIG. 2, including the conveyor tube, and showing the feed level in the feeder with the feeder in the raised position.
Figure 5:
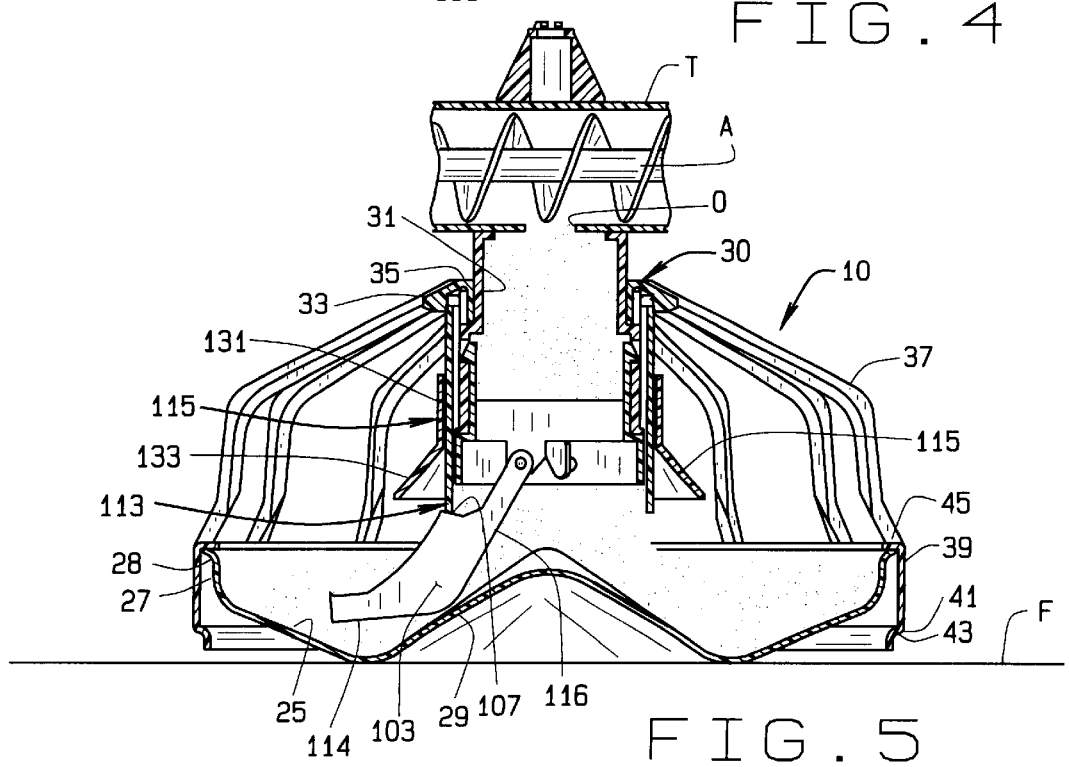
FIG. 5 is a cross-sectional view of the feeder in the lowered position, taken along line 5—5 of FIG. 3 including the conveyor tube, and showing the feed level in the feeder with the feeder in the lowered or collapsed position.

The grill assembly 25 includes an upper ring 30 having an inner circular wall 31 and an outer circular wall 33 joined by an upper surface 35. The inner wall 33 is sized to permit the drop tube 18 and the grill assembly 25 to be moved axially relative to each other. A plurality of spaced apart ribs 37 extend downwardly and outwardly from the ring outer wall 33. A circular wall 39 depends from the ribs 37. The wall 39 has an inwardly extending step 41, and a downwardly directed lip 43 at the inner edge of the step 41. The ribs 37 have a spacing, at the wall 39, sufficient to allow a chick to enter the feed pan. The grill wall 39 has a diameter slightly larger than the diameter of the feed pan lip 28; and the grill lip 43 has a diameter slightly larger than the diameter of the pan wall 27, but smaller than the diameter of the pan lip 28. The grill wall 39 also has a lip 45 extending inwardly from the top of the wall 39. When assembled, as seen in FIGS. 4—5, the grill wall 39 surrounds the pan lip 28, and the grill assembly 25 and pan 23 can move axially relative to each other. The pan lip 28 and the upper and lower lips 45 and 43, respectively, of the grill wall 39 cooperate to limit the axial movement of the pan and grill assembly relative to each other, so that they do not separate from each other.

The feed drop tube 18 assembly is shown in detail in FIGS. 7–10 and 12. It includes a main portion 51 which extends through the grill ring 30 and a drop tube support (or fin) assembly 53 at the distal end of the main portion 51. The drop tube main portion 51 includes a base section 55 and a cover section 57. The drop tube base section 55 is generally cylindrical and includes a bottom section 59 which receives the drop tube support assembly 53, as described below. The bottom section 59 includes a pair of vertical slots 61, spaced apart preferably by 180°, and two sets of vertical flanges or fingers 63 which are also spaced apart by 180°. The slots 61 and fingers are preferably spaced apart by about 90°. A reduced diameter upper section 65 extends up from the top of the bottom section 59. A pair of opposed walls 67 extend up from the upper section 65 and have a curved upper surface 69.

The drop tube cover section 57 includes a pair of curved walls 71 joined by a conical section 73. The curved walls 71 have steps 74 and slots 75 extending downwardly from the steps 73. The bottom of the conical section 73, between the walls 71, forms a generally semicircular, concave surface 75. A notch 76 extends upwardly from the surface 75.

The drop tube main section is preferably assembled around the conveyor tube T. The cover section 57 is positioned over the conveyor tube T at a desired location, and then the base section 55 is applied to the cover section 57. The base section fingers 63 are received in the cover section slots 75 to hold the cover and base sections together. Additionally, the base section 55 includes an axially extending groove 78, which receives a rib from the cover 57 to facilitate proper alignment between the base and cover sections. The rib, which is not shown in the drawings, extends inwardly along the edges of the walls 71. As can be appreciated, the curved surfaces 69 and 75 of the base and cover sections, respectively, define openings 77 in the drop tube 18 through which the conveyor tube T extends. The cover section 57 is also provided with fingers 79, which are used to support and electrical shock wire above the hanger assembly, as set forth in the above noted U.S. Pat. No. 5,718,187, which is incorporated herein by reference.

Figure 12:
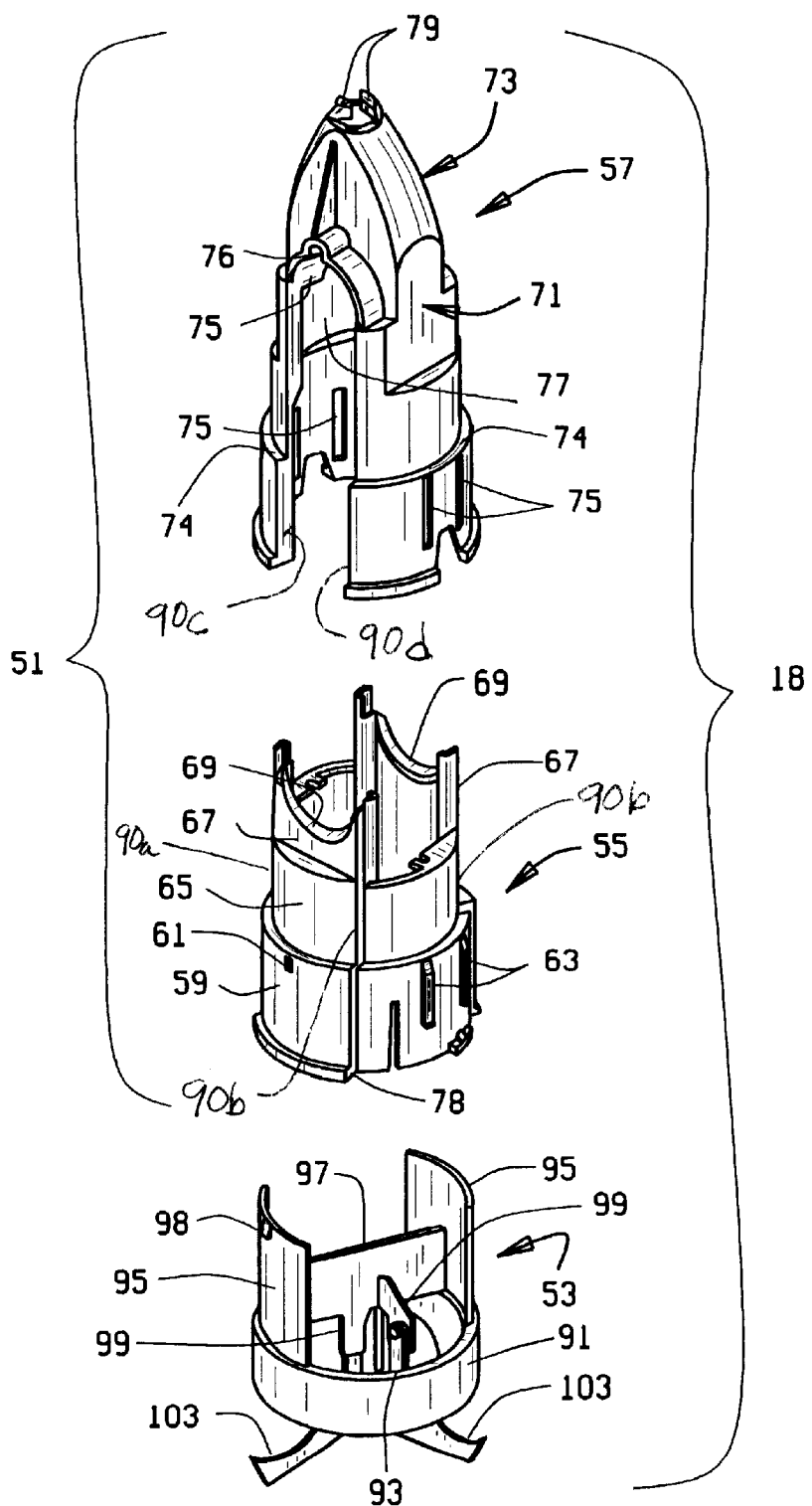
FIG. 12 is an exploded perspective view of the drop tube assembly.

As shown best in FIG. 12, base section 55 has a pair of spaced, vertically disposed grooves or slots 90a, 90b on opposed sides thereof. Further, cover section 57 has opposed pairs of spaced, vertically disposed, inwardly projecting flanges 90c, 90d on each side thereof which are received in corresponding slots 90a, 90b in the base section as the top cover section is axially aligned and slid downwardly with respect to the base section to assemble assembly 51. In this manner, the alignment of the top cover section and the base section are insured. Of course, as the top cover is installed on the base section, as described, the vertically disposed flanges 63 with align with and engage their respective vertical slots 75 in the top cover and will snap into place thereby to positively, but releasably, secure the top cover to the base section, as shown in FIGS. 7–10.

The drop tube support assembly 53 includes an annular ring 91 having an outer diameter substantially equal to the outer diameter of the bottom section 59 of the main portion base section 55. A circumferential lip 93 extends inwardly from the top of the ring 91 to define a top surface of the ring 91, and a pair of opposed arms 95 extend upwardly from the inner edge of the lip 93. A beam or brace 97 extends between the arms 95 and a finger 98 is formed on the outer surface of the arms 95 near the top of the arms. The bottom of the brace 97 is flush with the bottom surface of the lip 93. Three legs 99 extend downwardly from the brace 97, generally in the center of the beam. The legs 99 are generally flat (as opposed to being circular) and have surfaces defining three planes, which are preferably an angles of about 120° to each other. The legs 99 each have a peg 101 near the bottom there of. Support members (fins) 103 depend from the legs 99 to pivot relative to the legs 99. As shown, three support members 103 are employed. However, it will be appreciated that a plurality (e.g., two or more) of such support members are preferred.

Figure 9:
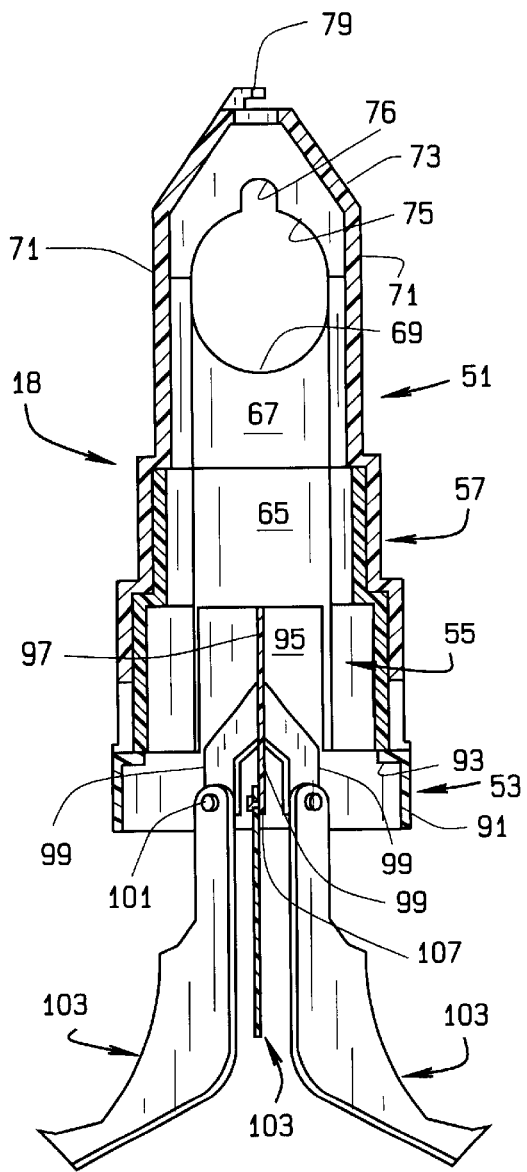
FIG. 9 is a vertical cross-sectional view of the drop tube taken along line 9—9 of FIG. 7.
Figure 10:
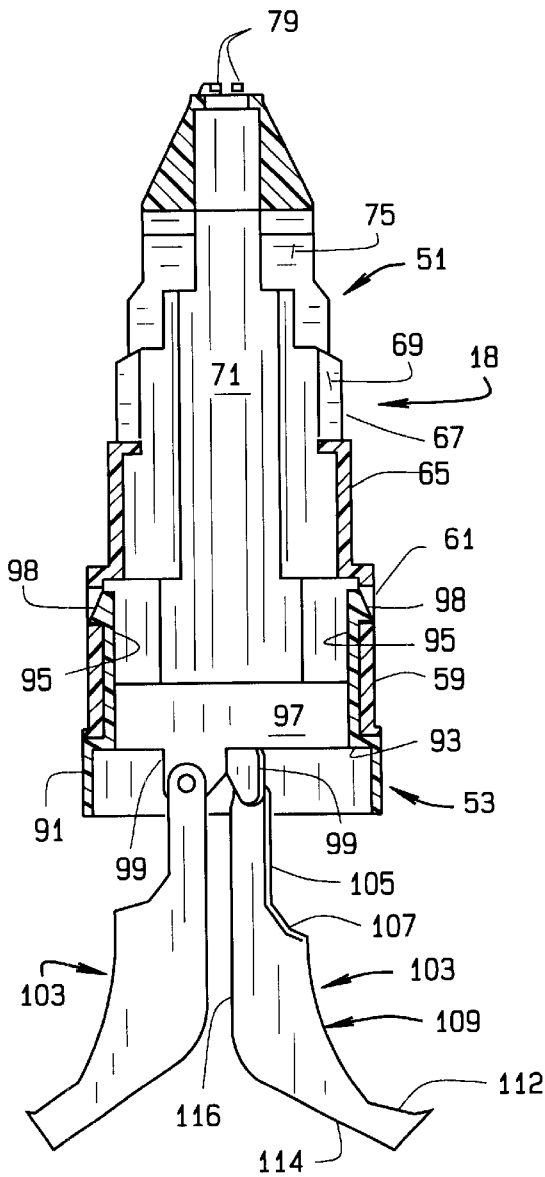
FIG. 10 is a vertical cross-sectional view of the drop tube taken along line 10—10 of FIG. 8.
Figure 11:
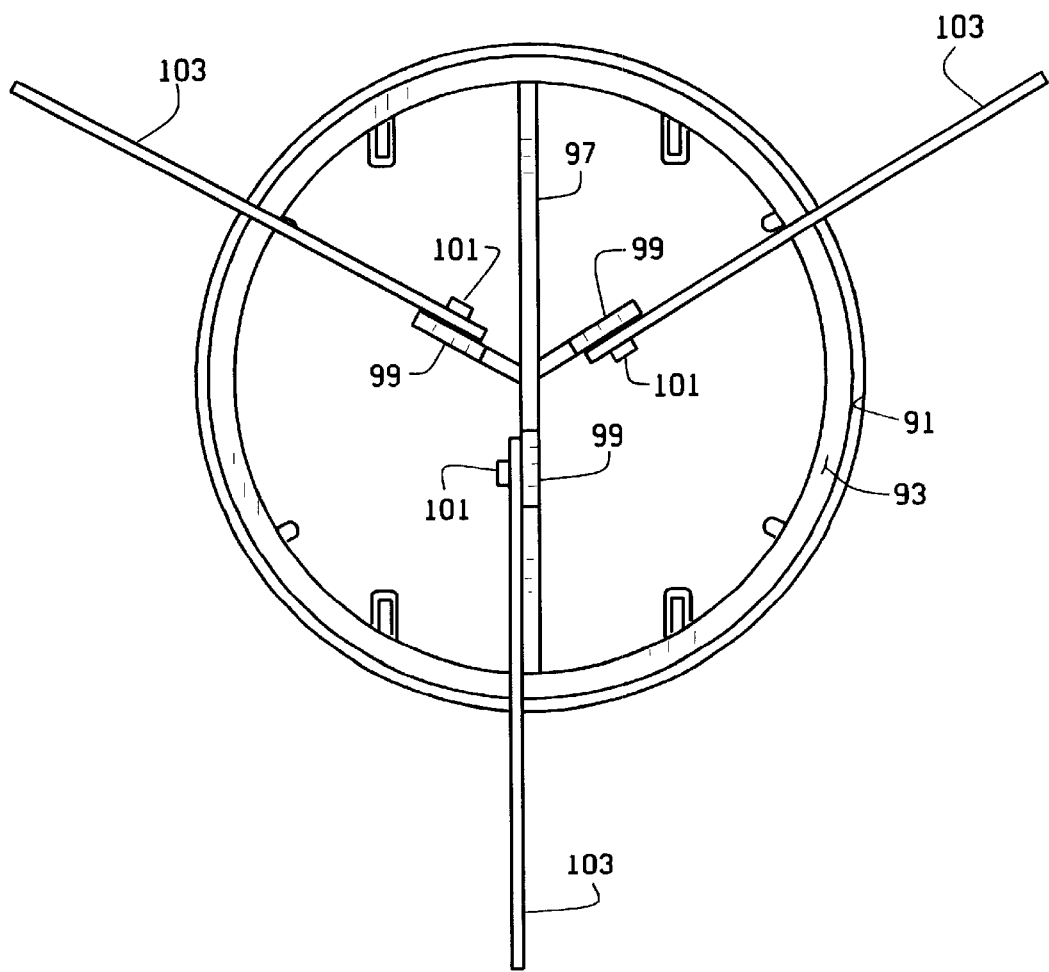
FIG. 11 is a bottom plan view of the drop tube.

As best shown in FIGS. 9 and 10, the support members 103 have a connection section or arm 105 with a hole 107 near the top thereof. The hole 107 is sized to fit over the pegs 101, and the pegs 101 are headed over to maintain the support members 103 on the legs 99. In this manner, the support members 103 are pivotally mounted with respect to beam 97 carried by the drop tube. The support members 103 each have an outward edge defining arm 105. Each support member has an inclined outer edge portion 107 defining, in part, a support body 109. As best seen in FIGS. 9 and 10, the outer edge of the support body 109 is curved. The arm 105 extends upwardly from the fin body 109. At their distal ends, each of the support members 103 includes a foot section 112 which extends outwardly from the bottom of the fin body portion 109. The outer edge of the foot section is inclined with respect to the outer edge of body portion 109. When the support members 101 hang vertically, as seen in FIG. 10, the bottom edge 114 of the fin foot and body portion forms an angle with the back or inner edge 116 of the connection and body sections which is approximately equal to the slope of the conical section 29 of the feeder pan 23.

To assemble the drop tube support assembly 53 to the drop tube main portion 51, the drop tube support assembly arms 95 are inserted into the drop tube base section 55 until the fingers 98 of the drop tube support assembly arms 95 are received in the drop tube base slots 61. The drop tube 18, and all of its components, are preferably formed from a pliable plastic. Thus, the fingers 98 of the drop tube support assembly 53 are snappingly received in the base portion slots 61. Additionally, the base section fingers 63 are snappingly received in the cover section slots 75.

To control the amount of feed spread onto conical section 29 and discharged into feed pan 23 for consumption, the feeder 10 includes a feed control 111 comprised of an inner section 113 and an outer section 115. The inner section 113 includes a cylindrical tube 117 and three legs 119 extending from the bottom of the tube 117. The legs 119 extend above the bottom of the tube 117 to define ribs 121 on the outer surface of the tube 117. Preferably, one of the ribs 121 is provided with a plurality of slots 123. The inner section 113 has an inner diameter slightly larger than the outer diameter of the feed tube 18, so that the inner section 113 (and hence the feed control 111) can move relative to the feed tube 18, the feed pan 23, and the grill assembly 25.

The feed control outer section 115 includes a generally cylindrical wall 131 from which a skirt 133 extends. The skirt 133 preferably extends radially outwardly and downwardly from the wall 131. The skit 133 may be joined to the wall 131 at the approximate center of the wall and have a bottom edge spaced slightly above the bottom edge of the outer section wall 131. The outer section 115 also includes three inner groove 135 which receive the ribs 121 of the inner section 113. A pawl/rack mechanism 137 on one of the grooves 135 engages the rib slots 123 to allow for mechanical adjustment of the inner and outer sections relative to each other and locks the inner and outer sections in a desired axial position relative to each other.

The operation of the feeder 10 is shown in FIGS. 4 and 5. When the feeder is assembled, the inner edges 113 and 115 ride on the feed pan conical section 29. When the feed tube 18 is lowered relative to the feed pan 23, the support members 103 spread out, as seen in FIG. 5. Conversely, when the feed tube 18 is raised relative to the feed pan 23, the support members 103 are drawn in, and hang generally vertically, as seen in FIG. 4.

When the chicks are young, the feeder 10 in its lowered or collapsed position, as seen in FIG. 5, with the feed pan 25 resting on the floor of the poultry house and with the drop tube assembly in its collapsed or shortened position. In this collapsed position, the top lip 45 of the grill wall 39 rests on the pan lip 28. In this lowered position, the relation of the feed pan and its accompanying rim is in a shallow depth position such that young chicks can see feed within the feed pan and can readily gain access to the feed in the feed pan 23. When the chicks are young, the feed tube 18 is dropped to its lowest position relative to the pan 23, so that the support members 103 will spread out, as seen in FIG. 4, and cammingly engage the upper surface of the cone formed in the feed pan. In this position, the bottom of the feed control inner tube 113 will rest on the shoulder or upper surface 107 of the fin body 109 and the fin body 109 rests or cammingly bears on the upper face of feed pan cone 29 such that the dimension between the lower surface of the support member which bears on cone 29 and the upper, outer surface of the support member which supports the lower end of the feed control tube 113 controls the distance or spacing of the lower end of the feed control tube and the feed pan cone so as to allow the feed pan 25 to be flooded with feed, as shown in FIG. 5.

As the chicks mature and grow, the feed tube 18 is raised (which also raises the grill assembly 25). As the feed tube 18 is raised, the lower surface of the support members 103 ride along the feed pan conical section 29 and pivot inwardly, until the hang substantially vertically from the drop tube support assembly legs 101, as seen in FIG. 4. As can be appreciated, the bottom of the feed control tube 113 rides on the upper edge of the fin body 109 and foot 111. Thus, as the feed tube 18 is raised, and the support members 103 are pulled inwardly, the feed control tube 113 will be automatically lowered relative to the feed pan. When the feed tube 18 is fully raised, the feed control tube 113 will be at its lowest position, as seen in FIG. 4, and spacing between the lower edge of feed control tube 113 and the feed pan cone 29 is appreciably less than the spacing shown in FIG. 5 (the flood condition) such that the amount of feed which is allowed to enter the pan 23 is reduced (as compared to the flood condition). In this manner a relatively uniform layer of feed is discharged from the drop tube onto the feed pan cone and into the lower recesses of the feed pan. As this feed is consumed by the birds, more feed will flow from the drop tube so as to replace the feed consumed.

As can be appreciated, the support members 103, by cooperating with the pan conical section 29, provide a surface upon which the feed control 111 rides, such that, when the feed tube is in its lowest position, as in FIG. 5, the feed control is spaced from the pan 23 to allow the pan to be flooded. However, as the feed tube is raised, the feed control 111 is automatically lowered to reduce the amount of feed which can be deposited in the pan 23.

As described above, the feeder is preferably, but not necessarily, a feeder as described in the aforementioned co-assigned U.S. Pat. No. 5,718,187, which is herein incorporated by reference. As described in the '187 patent, the feed pan is movable relative to the grill of the feeder and relative to the bottom of the drop tube between a shallow depth feed pan position and a deep depth position. In addition, as described in the '187 patent, a lost motion connection is provided between the grill and the drop tube such that the grill is rockable relative to the drop tube with this rocking motion of the grill allowing the feeder to accommodate uneven floor conditions. It will be further understood that if the feed pan of the feeder shown in the '187 is fixed with respect to the grill such that it cannot move between the aforesaid deep depth and shallow depth positions, the support members of this invention are nevertheless be operable to allow relative movement of the drop tube relative to the feed pan so as to allow selective flooding of the feed pan due to the lost motion connection between the drop tube and the grill of the feeder.

As various changes could be made in the above constructions without departing from the scope of the invention, it is intended that all matter contained in the above description or shown in the accompanying drawings shall be interpreted as illustrative and not in a limiting sense.

What is claimed is:

1. A poultry feeder comprising:
   a. a feed pan into which feed is deposited, said feed pan being movable between a deep position and a shallow position;
   b. a drop tube in communication with a source of feed for delivering feed to the feed pan;
   c. said drop tube being movable axially relative to the feed pan between a raised position and a lowered position with said drop tube being in said raised position when said feed pan is in its said shallow pan position and said drop tube being in its said lowered position when said feed pan is in its said deep pan position;
   d. said drop tube an inlet for said feed and an outlet for delivery of said feed to said feed pan with the space between the drop tube outlet and the feed pan defining a feed opening through which feed flows into the feed pan;
   e. said drop tube further having a control tube movable axially with respect to said drop tube, said control tube having a lower edge spaced from said feed tube with the spacing between said feed pan and said lower edge of said control tube defining a discharge opening for the discharge of feed from the drop tube into the feed pan; and
   f. a plurality of support members pivotally mounted to said drop tube body, said support members each having an upper edge adapted to be engaged by said control tube body and a lower edge adapted to be in engagement with said feed pan, said support members being movable relative to said feed pan and relative to said control tube between a flood position when said feed pan is in its said shallow pan position such that said lower edge of said control tube is spaced from said feed pan a distance such that feed dispensed from said drop tube will dispense sufficient feed into said feed pan so as to flood the feed pan with feed and another position when the feed pan is in its deep depth position such that the lower edge of said control tube is spaced closer to said feed pan such that feed dispensed into said feed pan will be less than such amount of feed required to flood said feed pan.

2. The poultry feeder of claim 1 wherein the support members each comprise a support body, a foot extending outwardly from a distal portion of said support body, and an arm extending from the proximal end of said support body, said support arm being pivotally connected to said drop tube body.

3. The poultry feeder of claim 2 wherein said support arm and support body have a lower edge and an upper edge, the dimension of said support arm from its upper edge to its lower edge being narrower than the dimension of said support body from its upper edge to its lower edge, the outer edges of said support arm and support body defining a shoulder, said control tube engaging said shoulder when said drop tube is in its said flood position.

4. The poultry feeder of claim 1 wherein said drop tube includes a brace which extends across said drop tube, said support members being pivotally mounted to said brace.

5. The poultry feeder of claim 4 including a drop tube support assembly mounted to the drop tube body, said drop tube support assembly including a ring, said brace and legs, and said support members.

6. A poultry feeder comprising:

a feed pan into which feed is deposited, said feed pan being movable relative to said feeder between a shallow depth position in which young chicks may readily see feed within said feed pan and a deep depth position in which the sides of the feed pan are deeper than when the feed pan is in said shallow depth position;

a drop tube in communication with a source of feed for delivering feed to the feed pan, the drop tube being movable axially relative to the feed pan between a raised position and a lowered position;

a feed level controller carried by said drop tube for controlling said feed opening and to thus control the amount of feed deposited in said feed pan, said feed level controller having a control tube moveable axially relative to the drop tube body, with the space between the bottom of said control tube and the feed pan defining a feed opening through which feed flows from said drop tube into said feed pan; and a plurality of support members which are pivotally carried by said drop tube; said support members automatically adjusting the position of said control tube relative to said drop tube and relative to said feed pan such that when the drop tube is in its lowered position, said control tube is in a raised position so as to allow said feed pan to be flooded with feed and when said control tube is in its lowered position so as to allow said feed pan to have a lesser amount of feed dispensed therein from said drop tube.

7. The poultry feeder of claim 6 wherein said support members are moveable between a first position when said drop tube is in its lowered position wherein said support members are in engagement with said feed pan and extend outwardly of said drop tube with said feed level controller resting on an upper edge of said support members, and a second position when the drop tube is in its raised position wherein the support members are substantially contained within an area defined by the diameter of the drop tube body and wherein said support members do not interfere with the position of said feed level controller.

8. The poultry feeder of claim 7 wherein the support members each comprise a support body, a distal foot extending outwardly from a bottom of said support body, and a proximal arm extending from said body and being pivotally connected to said drop tube body.

9. The poultry feeder of claim 8 wherein said support arm and said support body have respective outer and inner edges, with said support arm being narrower than said support body, said support arm and said support body defining a shoulder, said control tube resting upon said shoulder when said drop tube is in its lowered position.

10. The poultry feeder of claim 7 wherein said drop tube includes a brace which extends across said drop tube, said support members being pivotally mounted to said brace.

11. A poultry feeder comprising:

a feed pan into which feed is deposited;

a drop tube in communication with a source of feed for delivering feed to the feed pan;

the drop tube being movable axially relative to the feed pan between a raised position and a lowered position and comprising:

a body having an inlet and an outlet, the space between the drop tube outlet and the feed pan defining a feeder opening through which feed flows into the feed pan; and a plurality of fins pivotally mounted to the body and extending from the body outlet to be in contact with the feed pan at least when the drop tube is in the lowered position; the fins having an upper edge, the fins being movable between a spread-apart position when said drop tube is in its lowered position wherein said fins extend outwardly of said drop tube body, and collapsed position when the drop tube is in its raised position wherein the fins are substantially contained within an area defined by the diameter of the drop tube body; and a feed level controller for altering the size of the feeder opening to control the amount of feed deposited in the feed pan, the feed level controller having a body journaled about the drop tube body and moveable axially relative to the drop tube body; the feed level controller body having a bottom edge; whereby, when the drop tube is in its lowered and said fins are in their spread-apart position, the feed level controller sits on said fin upper edges and is spaced from said feed pan to define a large feeder opening and, when said drop tube is in its raised position and the fins are in their collapsed position, said feed controller is closer to said feed pan to reduce the size of said feeder opening to restrict the amount of feed which is deposited in the feed pan.

12. The poultry feeder of claim 11 wherein the fins each comprise a fin body, a foot extending outwardly from a bottom of the fin body, and an arm extending upwardly from said body; said fin arm being pivotally connected to said drop tube body.

13. The poultry feeder of claim 12 wherein said fin arm and body have a collinear back edge; and said fin arm being narrower than said fin body, said fin arm and fin body defining a shoulder; said feed level controller resting upon said shoulder when said drop tube is in its lowered position.

14. The poultry feeder of claim 11 wherein said drop tube includes a brace which extends across said drop tube and legs depending from said brace; said fins being pivotally mounted to said legs.

15. The poultry feeder of claim 14 including a fin assembly mounted to the drop tube body; said fin assembly including a ring; said brace and legs; and said fins.

16. A poultry feeder comprising:

a. a feed pan into which feed is deposited;

b. a drop tube in communication with a source of feed for delivering feed to the feed pan;

c. said drop tube being movable relative to the feed pan;

d. said drop tube comprising an inlet for said feed and an outlet for delivery of said feed to said feed pan with the space between the drop tube outlet and the feed pan defining a feed opening through which feed flows into the feed pan;

e. said drop tube further having a control tube movable generally axially with respect to said drop tube, said control tube having a lower edge spaced from said feed tube with the spacing between said feed pan and said lower edge of said control tube defining a discharge opening for the discharge of feed from the drop tube into the feed pan; and f. a plurality of support members pivotally mounted to said drop tube body, said support members each having an upper edge adapted to be engaged by said control tube body and a lower edge adapted to be in engagement with said feed pan, said support members being movable relative to said feed pan and relative to said control tube between a flood position when said drop tube is a first position with respect to said feed pan such that said lower edge of said control tube is spaced from said feed pan a distance such that feed dispensed from said drop tube will flood the feed pan with feed and another position when the drop tube is in a second position such that feed dispensed into said feed pan will be less than such amount of feed required to flood said feed pan.

17. The poultry feeder of claim 16 wherein the support members each comprise a support body, a foot extending outwardly from a distal portion of said support body, and an arm extending from the proximal end of said support body, said support arm being pivotally connected to said drop tube body.

18. The poultry feeder of claim 17 wherein said support arm and support body have a lower edge and an upper edge, the dimension of said support arm from its upper edge to its lower edge being narrower than the dimension of said fin support body from its upper edge to its lower edge, the outer edges of said support arm and support body defining a shoulder, said feed level controller engaging said shoulder when said drop tube is in its said flood position.

19. The poultry feeder of claim 16 wherein said drop tube includes a brace which extends across said drop tube, said support members being pivotally mounted to said brace.

20. The poultry feeder of claim 19 including a drop tube support assembly mounted to the drop tube body, said drop tube support assembly including a ring, said brace and legs, and said support members.

* * * * *